United States Patent [19]

Fujiwara et al.

[11] Patent Number: 4,549,566
[45] Date of Patent: Oct. 29, 1985

[54] FLOW VOLUME CONTROL DEVICE FOR POWER STEERING SYSTEM

[75] Inventors: Hidetoshi Fujiwara; Akihiko Sato, both of Okazaki, Japan

[73] Assignee: Toyoda Koki Kabushiki Kaisha, Kariya, Japan

[21] Appl. No.: 661,088

[22] Filed: Oct. 15, 1984

[30] Foreign Application Priority Data

Oct. 18, 1983 [JP] Japan .................................. 58-194982

[51] Int. Cl.$^4$ ...................... G05D 11/00; F04B 49/08
[52] U.S. Cl. .................................... 137/117; 137/500; 417/300
[58] Field of Search ................ 137/117, 500; 180/141; 417/300

[56] References Cited

U.S. PATENT DOCUMENTS 4,251,193 2/1981 Minnis .............................. 137/117 X
4,311,161 1/1982 Narumi ................................ 137/117
4,361,166 11/1982 Honaga et al. ....................... 137/117

Primary Examiner—Robert G. Nilson
Attorney, Agent, or Firm—Oblon, Fisher, Spivak, McClelland & Maier

[57] ABSTRACT

A flow volume control device for use in a power steering system, which comprises: a casing having an inlet port, a reflux port and a delivery port; a fluid passage formed in the casing in communication with the inlet, reflux and delivery ports; fixed orifice means provided in the fluid passage to restrict the flow or pressurized fluid from the inlet port to the reflux and delivery ports; and throttle means provided in the fluid passage between the fixed orifice means and delivery port. The control device further includes a main spool movable in response to pressure differential across the throttle means for controlling the flow rate of the pressurized fluid from the fixed orifice means to the reflux port of maintain a predetermined flow rate of the fluid to be fed to the delivery port through the throttle means; an auxiliary spool movable in response to the pressure differential across the fixed orifice means for reducing the open area of the throttle means according to increases of fluid pressure supplied to the inlet port; and a branch passage formed in the casing by-passing the fixed orifice to connect said inlet port directly to the throttle means, the branch passage being opened when the auxiliary spool is shifted to reduce the open area of the throttle means to slow down the speed of movement of the auxiliary spool.

4 Claims, 6 Drawing Figures

FLOW VOLUME CONTROL DEVICE FOR POWER STEERING SYSTEM

BACKGROUND OF THE INVENTION

1. Field of the Invention

This invention relates to a flow volume control device suitable for use in a power steering system where an operating fluid delivered from a pump is fed to a power steering mechanism through a throttle passage and surplus fluid is refluxed to the suction side of the pump through a by-pass passage. More particularly, the invention concerns a flow volume control device which is adapted to lower the flow rate of the fluid to be supplied to a power steering mechanism in response to increases in the rotational speed of a pump.

2. Description of the Prior Art

In a high speed operation of a motor vehicle, it is desirable to let the driver perceive the reaction force of steering in an increased degree. For this purpose, there has been developed the so-called speed sensitive type pump which is adapted to reduce the discharge rate of an operating fluid to be fed to a power steering mechanism in response to increases in the rotational speed of the pump.

FIG. 1 shows an example of the flow volume control device with such an function, utilizing the pressure differential which is produced across a fixed orifice or throat 1 according to the increase of the discharge rate of a pump resulting from increases in its rotational speed. Namely, an auxiliary spool 2 is shifted by the pressure differential for variably controlling the open area of throttle passages 3 in such a manner as to lower the discharge rate Q when the rotational speed N of a pump reaches a predetermined value.

Since the open area of the fixed orifice 1 is constant, the conventional flow control device of the above-described construction has a problem that the pressure differential across the auxiliary spool 2 is increased abruptly by the increase of the rotational speed N of the pump as indicated at A3 of FIG. 2, suddenly shifting the position of the auziliary spool 2. Accordingly, the throttle passages 3 are constricted quickly and the discharge rate Q is varied from Q1 to Q2 as indicated A1 of FIG. 3, failing to give a smooth feeling in steering.

SUMMARY OF THE INVENTION

It is therefore an object of the present invention to provide a flow volume control device which is capable of gradually lowering the discharge rate to ensure a smooth feeling of steering.

According to the present invention, there is provided a flow volume control device suitable for use in a power steering system. The device of the invention essentially includes: a casing having an inlet port, a reflux port and a delivery port; a fluid passage formed in the casing in communication with the inlet, reflux and delivery ports; a fixed orifice means provided in the fluid passage to restrict flow of pressurized fluid from the inlet port to the reflux and delivery ports; and a throttle means provided in the fluid passage between the fixed orifice means and delivery port. The control device further includes a main spool which is movable in response to pressure differential across the throttle means for controlling the flow rate of the fluid from the fixed orifice means to the reflux port to maintain a predetermined flow rate of the fluid to be fed to the delivery port through the throttle means; an auxiliary spool movable in response to pressure differential across the fixed orifice means for reducing the open area of the throttle means according to increases of fluid pressure supplied to the inlet port; and a branch passage formed in the casing and connecting the inlet port directly to the throttle means without passing through the fixed orifice. When the auxiliary spool is shifted to reduce the open area of the throttle means, the branch passage is opened to slow down the speed of movement of the auxiliary spool.

The above and other objects, features and advantages of the invention will become apparent from the following description and appended claims, taken in conjunction with the accompanying drawings, which show by way of example some preferred embodiments of the invention.

DESCRIPTION OF PREFERRED EMBODIMENTS

Figure 4:
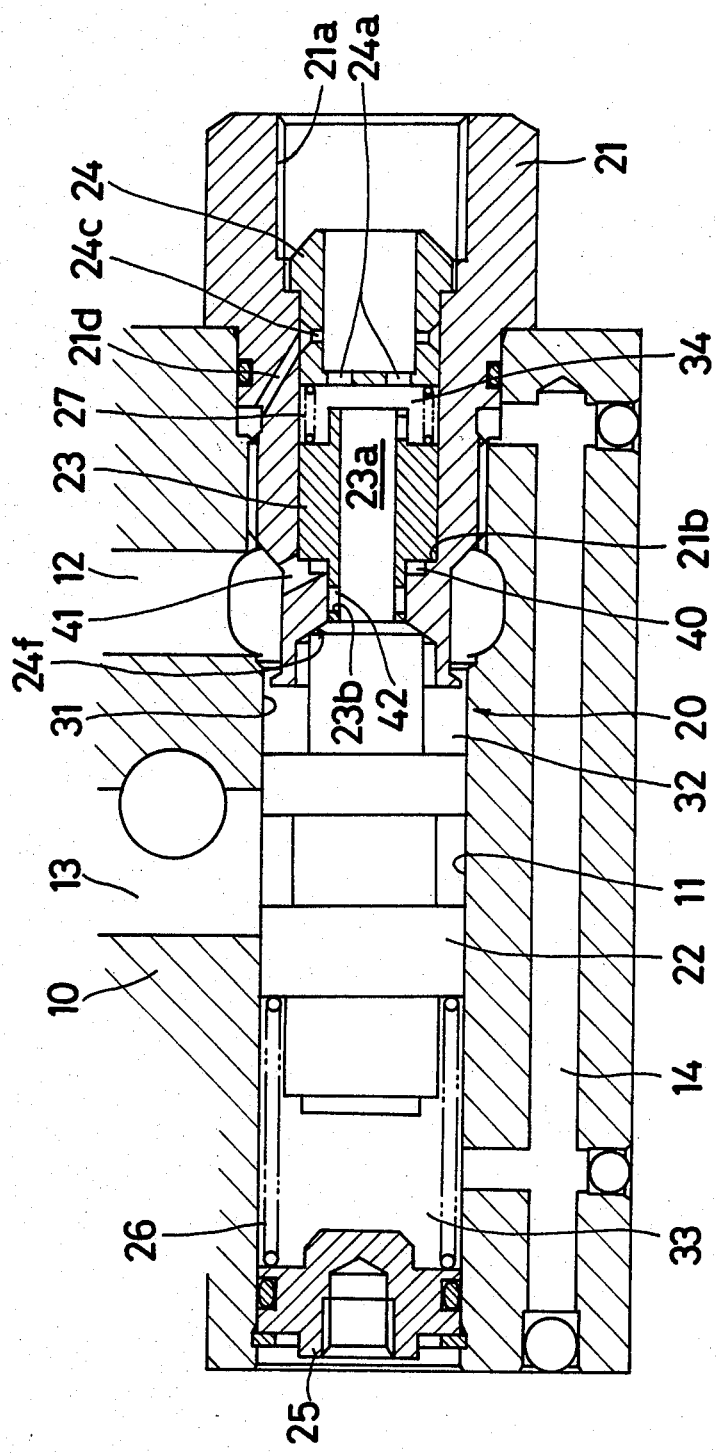
FIG. 4 is a longitudinal section of a flow volume control device according to the present invention, built in a casing of a hydraulic pump of a power steering system.

Referring to FIG. 4, there is illustrated a flow volume control device 20 according to the present invention, which is built into a housing 10 of a hydraulic pump and includes as its major components a union 21, a main flow controlling spool valve 22, an auxiliary spool 23 and a stop member 24.

The pump housing 10 which constitutes a main body is provided with a receptacle hole 11 axially therethrough, and the union 21 which also constitutes a main body is threaded fluid-tight into one end of the receptacle hole 11. A plug 25 is fitted fluid-tight into the other end of the receptacle hole 11. The union 21 is substantially cylindrical in shape and has its inner end loosely fitted into the receptacle hole 11 to form, between its outer periphery and the inner periphery of the receptacle hole 11, a fixed orifice 31 which holds the receptacle hole 11 constantly in communication with a supply passage 12 formed in the pump housing 10. Due to its resistance to flow, the fixed orifice or throat 31 has a function of producing a pressure differential between its upstream and downstream sides, namely, between the supply passage 12 and receptacle hole 11 upon increase of the discharge rate of the operating fluid to the supply passage 12. A delivery port 21a formed at the outer end of the union 21 is connected to a normally open type servo valve of the power steering system, and the supply passage 12 is communicated with the exhaust chamber of the pump.

The main spool valve 22 is slidably fitted in the receptacle hole 11 for movement between the union 21 and the plug 25, and defines a first valve chamber 32 and a second valve chamber 33 within the receptacle hole 11. The main spool valve 22 is resiliently abutted against a concave surface 24f formed at the inner end of the union 21, by a spring 26 which is fitted in the second valve chamber 33, blocking the communication between the supply passage 12 and the by-pass passage 13. The by-pass passage 13 is communicated with the suction chamber of the hydraulic pump.

The auxiliary spool 23 is slidably fitted in an internal bore of the union 21, and resiliently abutted against a stepped portion 21b at the inner end of the union 21 by a spring 27 interposed between the spool 23 and the stop member 24 which is fitted in the internal bore. The auxiliary spool 23 is centrally formed with an axial through hole 23a, while the stop member 24 which is abuttingly engageable with the auxiliary spool 23 is formed with a plural number of throttle passages 24a around a circle concentric with the center axis of the auxiliary spool 23. Through the axial hole 23a and throttle passages 24a, the first valve chamber 32, fluid chamber 34 and delivery port 21a of the union 21 are communicated with each other.

In addition to the throttle passages 24a, the stop member 24 is formed with a small hole 24c to communicate the downstream side of the throttle passages 24a with the second valve chamber 33 through the small hole 24c and communication passages 21d and 14 provided in the union 21 and pump housing 10, respectively. Consequently, part of the fluid on the downstream side of the throttle passages 24a is led into the second valve chamber 33 to apply the pressures on the upstream and downstream sides of the throttle passages 24a to the opposite end faces of the main spool valve 22. According to the pressure differential across the throttle passages 24a, the spool valve 22 which tends to maintain a constant pressure differential is shifted in the axial direction to vary the open area of the by-pass passage 13.

Further, a pressure chamber 40 which is formed between the stepped end face of the auxiliary spool 23 and an stepped wall on the inner periphery of the union 21 is communicated with the supply passage 12 through a pressure lead 41 formed in the union 21 to slide the auxiliary spool 23 against the action of the spring 27 according to variations of the supplied pressure. When the auxiliary spool 23 is slided by a predetermined distance, the pressure chamber 40 is brought into communication with a radial passage 23b which constitutes a control throttle 42. The open area of this control throttle 42 is increased by the sliding movement of the auxiliary spool 23 to let the fluid flow into the through hole 23a from the supply passage 12 according to its open rate.

With the flow volume control device of the foregoing construction, upon driving the hydraulic pump (not shown) by a vehicle engine, the operating fluid is delivered to the supply passage 12 from the exhaust chamber of the pump. The supplied operating fluid is fed to the first valve chamber 32 through the fixed orifice 31, and then led through the axial passage 23a and throttle passages 24a to the delivery port 21a of the union 21 to supply same to the power steering system.

Figure 3:
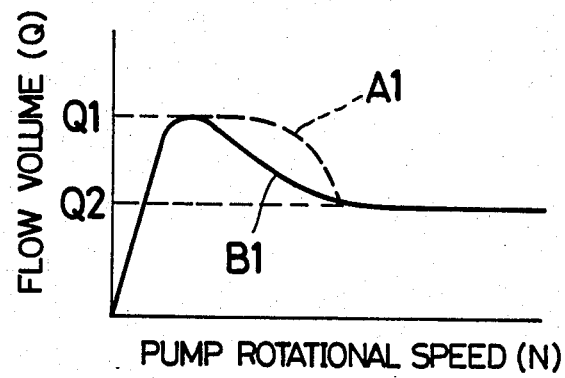
FIG. 3 is a diagram showing the variation in flow rate against the rotational speed of the pump.

The discharge rate of the operating fluid is small when the hydraulic pump is driven at a low rotational speed, so that the main spool valve 22 closes the by-pass passage 13 to send the operating fluid entirely to the power steering system through the passage 24a. However, if the discharge rate is increased by an increase of the rotational speed of the pump, the main spool valve 22 is shifted to maintain a constant pressure differential across the throttle passages 24a, uncovering the by-pass passage 13 to return surplus flows of the operating fluid to the suction chamber of the pump through the by-pass passage 13. As a result, the operating fluid is fed to the power steering system at a rate Q1 which is determined by the throttle passages 24a, as shown in FIG. 3.

If the rotational speed of the pump is further increased by a shift to a high speed operation of the vehicle, the discharge rate of the operating fluid to the supply passage 12 is increased accordingly, elevating the fluid pressure in the supply passage 12 due to the flow resistance of the fixed orifice 31. As a result, there occurs a pressure differential between the supply passage 12 and the first valve chamber 32, and the pressure prevailing in the supply passage 12, which acts on the auxiliary spool 23 through the pressure lead 41, applies a pressure thereon against the action of the spring 27. Therefore, the auxiliary spool 23 is gradually moved against the force of the spring 27 to choke the throttle passages 24a, tending to reduce quickly the flow rate of the operating fluid to be fed to the power steering system.

Figure 1:
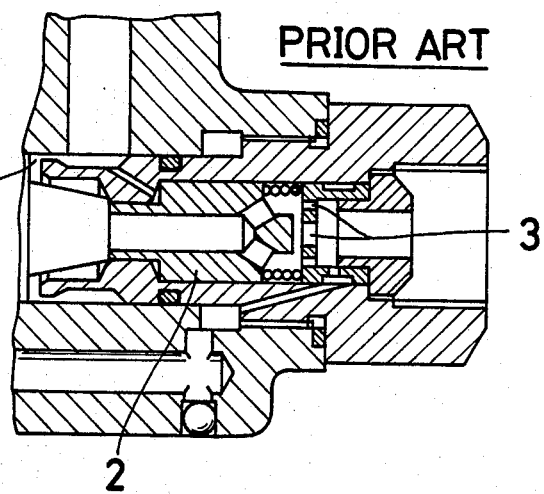
FIG. 1 is a fragmentary longitudinal section of a conventional flow volume control device.
Figure 2:
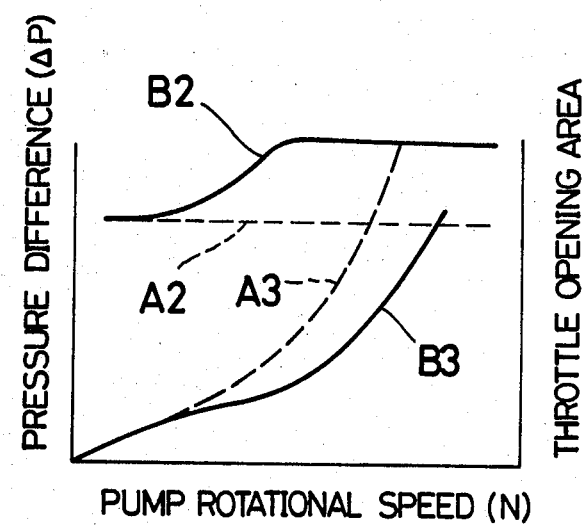
FIG. 2 is a diagram showing the throttle open area and pressure differential against the rotational speed of the pump.
Figure 5:
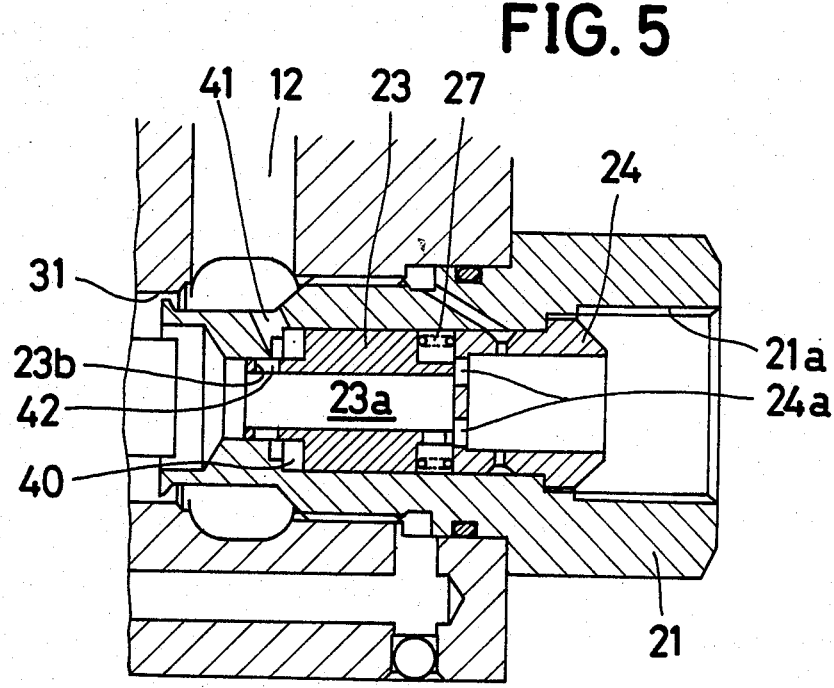
FIG. 5 is a fragmentary longitudinal section of the same flow volume control device but showing the auxiliary spool in shifted position.

According to the invention, however, the pressure chamber 40 is communicated with the radial passage 23b when the auxiliary spool 23 is moved by a predetermined distance as shown in FIG. 5, so that the supply passage 12 and axial through hole 23a are communicated with each other through an open area consisting of the combination of the fixed orifice 31 and the control throttle 42 as indicated at B2 of FIG. 2. Consequently, as compared with the conventional counterparts, the pressure in the pressure chamber 40 is increased gradually as indicated at B3 of the same figure, and therefore the auxiliary spool 23 is slided slowly according to the pressure increase. As a result, the throttle passages 24a are gradually choked, moderately reducing the flow rate of the operating fluid to the power steering system from Q1 to Q2 as indicated at B1 in FIG. 3.

Thereafter, if the pressure in the supply passage 12 is elevated more by a further increase of the fluid discharge rate, the auxiliary spool 23 is finally abutted against the stop member 24 to set the throttle passages 24a for the minimum open area. Accordingly, the flow rate of the operating fluid to be fed to the power steering system is maintained at the reduced rate Q2 which is determined by the throttle passages 24a as shown in FIG. 3.

Thus, the flow control device of the present invention is adapted to reduce the flow rate of the operating fluid to a power steering system gradually in a high speed operation of a vehicle to preclude rugged or disagreeable sensations of feeling in steering operation. The fluid feed rate is suppressed during a high speed operation, so that the reaction force of steering can be perceived sufficiently by a driver to enhance stability at high speeds.

In varying the flow rate from Q1 to Q2 in the foregoing embodiment, it is possible to obtain arbitrary characteristics by varying the diameter or axial position of the radial passage 23b.

Figure 6:
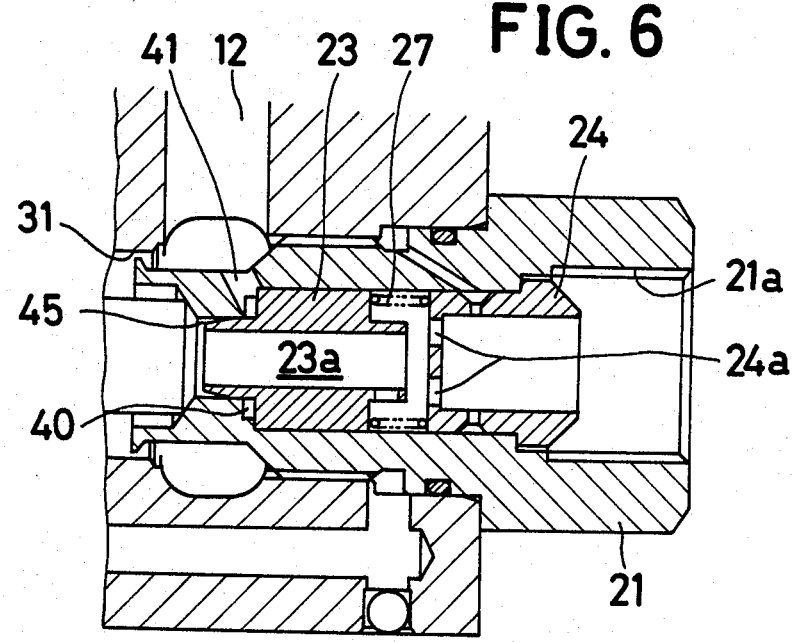
FIG. 6 is a fragmentary longitudinal section of another embodiment of the flow volume control device according to the invention.

The means for constituting the throttle control 42 is not limited to the radial passage 23b as employed in the foregoing embodiment. For example, a tapered portion may be provided at the fore end of the auxiliary spool 23 as shown in FIG. 6 to form an annular throttle control 45 between the tapered portion and the inner periphery of the union 21 as the spool 23 is axially shifted.

As clear from the foregoing description, the present invention employs a control throttle in parallel relation with a fixed orifice, controlling the open area of the control throttle by an auxiliary spool in such a manner as to prevent an abrupt variation in the pressure differential across the spool. With this arrangement, the sliding speed of the auxiliary spool is lowered, reducing the discharge rate of the operating fluid gradually to ensure a smooth feeling of steering.

Obviously, numerous modifications and variations of the present invention are possible in light of the above teachings. It is therefore to be understood that within the scope of the appended claims, the present invention may be practiced otherwise than as specifically described herein.

What is claimed is:

1. A flow volume control device for use in a power steering system, comprising:
   a casing having an inlet port, a reflux port and a delivery port;
   a fluid passage formed in said casing in communication with said inlet, reflux and delivery ports;
   a fixed orifice means provided in said fluid passage to restrict the flow of pressurized fluid from said inlet port to said reflux and delivery ports;
   a throttle means provided in said fluid passage between said fixed orifice means and delivery port;
   a main spool movable in response to pressure differential across said throttle means for controlling the flow rate of said pressurized fluid from said fixed orifice means to said reflux port to maintain a predetermined flow rate of the fluid to be fed to said delivery port through said throttle means;
   an auxiliary spool movable in response to the pressure differential across said fixed orifice means for reducing the open area of said throttle means according to increases of fluid pressure supplied to said inlet port; and
   a branch passage formed in said casing bypassing said fixed orifice means to connect said inlet port directly to said throttle means, said branch passage being opened when said auxiliary spool is shifted to reduce the open area of said throttle means thereby to slow down the speed of movement of said auxiliary spool.

2. A flow volume control device as set forth in claim 1, wherein:
   said casing includes a union fixedly fitted at one end of a receptacle hole forming part of said fluid passage and having said delivery port;
   said throttle means is fixedly provided in an axial through hole formed in said union as part of said fluid passage;
   said auxiliary spool is slidably fitted in said axial through hole of said union and retractably movable toward said throttle means for reducing the open area thereof; and
   said branch passage is formed in said union in such a manner as to communicate said inlet port with an axial through hole of said auxiliary spool by disengagement from an inner end portion thereof when said auxiliary spool is moved toward said throttle means.

3. A flow volume control device as set forth in claim 2, wherein said branch passage comprises:
   a pressure lead formed in said union for introducing pressurized fluid from said inlet port directly into a fluid chamber formed between said union and auxiliary spool for moving same toward said throttle means; and
   a radial passage formed in an inner end portion of said auxiliary spool to permit fluid flows from said fluid chamber to said axial through hole of said auxiliary spool when said auxiliary spool is moved toward said throttle means.

4. A flow volume control device as set forth in claim 2, wherein said branch passage comprises:
   a pressure lead formed in said union for introducing pressurized fluid from said inlet port directly into a fluid chamber formed between said union and auxiliary spool for moving same toward said throttle means; and
   a tapered surface provided on the circumference of an inner and portion of said auxiliary spool to permit fluid flows from said fluid chamber to said axial through hole of said union when said auxiliary spool is moved toward said throttle means.

* * * * *